(12) United States Patent
Arcese et al.

(10) Patent No.: US 9,871,910 B2
(45) Date of Patent: *Jan. 16, 2018

(54) USAGE OF SOFTWARE PROGRAMS ON MOBILE COMPUTING DEVICES

(71) Applicant: International Business Machines Corporation, Armonk, NY (US)

(72) Inventors: Mauro Arcese, Rome (IT); Giuseppe Ciano, Rome (IT); Claudio Marinelli, Latina (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,318

(22) Filed: Oct. 26, 2015

(65) Prior Publication Data

US 2016/0269542 A1 Sep. 15, 2016

Related U.S. Application Data

(63) Continuation of application No. 14/641,556, filed on Mar. 9, 2015.

(51) Int. Cl.
*H04W 24/00* (2009.01)
*H04M 1/725* (2006.01)
(Continued)

(52) U.S. Cl.
CPC ...... *H04M 1/72572* (2013.01); *H04L 47/828* (2013.01); *H04W 4/02* (2013.01); *H04M 1/72577* (2013.01)

(58) Field of Classification Search
CPC ...................................................... H04W 4/02
(Continued)

(56) References Cited

U.S. PATENT DOCUMENTS 8,250,540 B2 8/2012 Kulaga et al.
8,732,841 B2 5/2014 Ronning et al.
(Continued)

FOREIGN PATENT DOCUMENTS

EP 1645985 B1 9/2009

OTHER PUBLICATIONS

Lubke et al., "MobilisGroups: Location-based Group Formation in Mobile Social Networks," Second IEEE Workshop Pervasive Collaboration and Social Networking, pp. 502-507, 978-1-61284-937-9/11 ©2011.

(Continued)

*Primary Examiner* — Tanmay Shah
(74) *Attorney, Agent, or Firm* — Daniel C. Housley

(57) ABSTRACT

A solution is provided for controlling usage of one or more software programs on one or more mobile computing devices. A corresponding method comprises monitoring an indication of a position of each mobile computing device to determine a location area of the mobile computing device. The method comprises assigning each one of the software programs to a usage group. For each location area, the software programs of each software program type are assigned to the corresponding usage groups providing one or more usage characteristics that fulfill one or more usage requirements of each software program; this is performed according to one or more optimization criteria depending on one or more usage weights of each usage group. The method comprises enabling the usage of each software program according to the usage characteristics of the corresponding usage group.

9 Claims, 7 Drawing Sheets

(51) Int. Cl.
*H04L 12/911* (2013.01)
*H04W 4/02* (2009.01)

(58) Field of Classification Search
USPC ...................................................... 455/456.3
See application file for complete search history.

(56) References Cited

U.S. PATENT DOCUMENTS

| | | |
|---|---|---|
| 9,479,630 B1 | 10/2016 | Chowdhury |
| 2011/0201358 A1 | 8/2011 | Karaoguz et al. |
| 2012/0109826 A1 | 5/2012 | Kobres |
| 2013/0115916 A1 | 5/2013 | Herz |
| 2013/0324097 A1 | 12/2013 | Roberts et al. |
| 2014/0053234 A1 | 2/2014 | Barton et al. |
| 2014/0171052 A1 | 6/2014 | LaMarca et al. |
| 2015/0073709 A1 | 3/2015 | Huang |
| 2015/0111600 A1 | 4/2015 | Liu et al. |

OTHER PUBLICATIONS

Unknown, "Licensing Overview," http://developer.android.com/google/play/licensing/overview.html, 5 pages, (last Feb. 26, 2015 12:34 PM).

Arcese et al., "Usage of Software Programs on Mobile Computing Devices", U.S. Appl. No. 14/641,556, filed Mar. 9, 2015.

List of IBM Patents or Patent Applications Treated as Related, dated Oct. 21, 2015, pp: 1-2.

USAGE OF SOFTWARE PROGRAMS ON MOBILE COMPUTING DEVICES

BACKGROUND

The present disclosure relates to the Information Technology (IT) field. More specifically, this disclosure relates to the control of the usage of software programs on mobile computing devices.

Mobile computing devices (or simply mobile devices) have become more and more popular in recent years, especially thanks to the widespread diffusion of smart-phones and tablets. The mobile devices make many activities substantially ubiquitous, since they may be used almost everywhere; particularly, users of the mobile devices may run a number of mobile software applications, also known as (mobile) apps. The apps are software programs that are specifically designed to run on the mobile devices. For this purpose, the apps are relatively thin (to cope with computing/supply power constraints of the mobile devices), simple (to cope with small screens of the mobile devices) and fast (to cope with reduced attention of the users in mobility); conversely, the apps may exploit specific features that are typically available on the mobile devices (for example, GPS receivers, cameras, accelerometers). User demand and development facility have caused an explosion of the number and variety of the apps (for example, for information retrieval, e-commerce, multi-media playing, games).

The usage of the apps (like any other software programs) may require the compliance with specific limitations (for example, available license entitlements, allowed resource consumptions); however, the control of the usage of the apps on the mobile devices may be quite challenging.

For this purpose, for example, online stores are provided to browse available apps (for example, for a specific operating system), view information about them (comprising user's reviews and ratings) and download selected apps. Some stores also offer a licensing service which may be used to enforce licensing policies for the apps that are downloaded from them; particularly, an app may query a licensing server to verify whether it is correctly licensed for use on the mobile device wherein it is installed, in order to enable or disable its use accordingly (for example, with the use of the app that is enabled only when a user of the mobile device is a recorded purchaser of the app).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of controlling the usage of software programs on mobile computing devices according to a grouping thereof.

Particularly, an aspect provides a method for controlling usage of one or more software programs on one or more mobile computing devices. The method comprises monitoring an indication of a position of each mobile computing device to determine a location area of the mobile computing device (among a plurality of location areas). The method comprises assigning each one of the software programs to a usage group (among a plurality of usage groups of a software program type of the software program for the location area of the corresponding mobile computing device). For each location area, the software programs of each software program type are assigned to the corresponding usage groups providing one or more usage characteristics that fulfill one or more usage requirements of each software program; this is performed according to one or more optimization criteria depending on one or more usage weights of each usage group. The method comprises enabling the usage of each software program according to the usage characteristics of the corresponding usage group.

In an embodiment, said assigning each one of the software programs to a usage group comprises, for each location area, assigning the software programs of each software program type to the usage groups of the software program type for the location area further according to one or more usage constraints of the usage groups of the software program type for the location area.

In an embodiment, said assigning each one of the software programs to a usage group comprises, for each location area, moving at least one of the software programs from the corresponding usage group to a different one of the usage groups of the corresponding software program type for the location area.

A further aspect provides a computer program for implementing this method (and a corresponding computer program product).

A further aspect provides a corresponding system.

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation).

DETAILED DESCRIPTION

Figure 1:
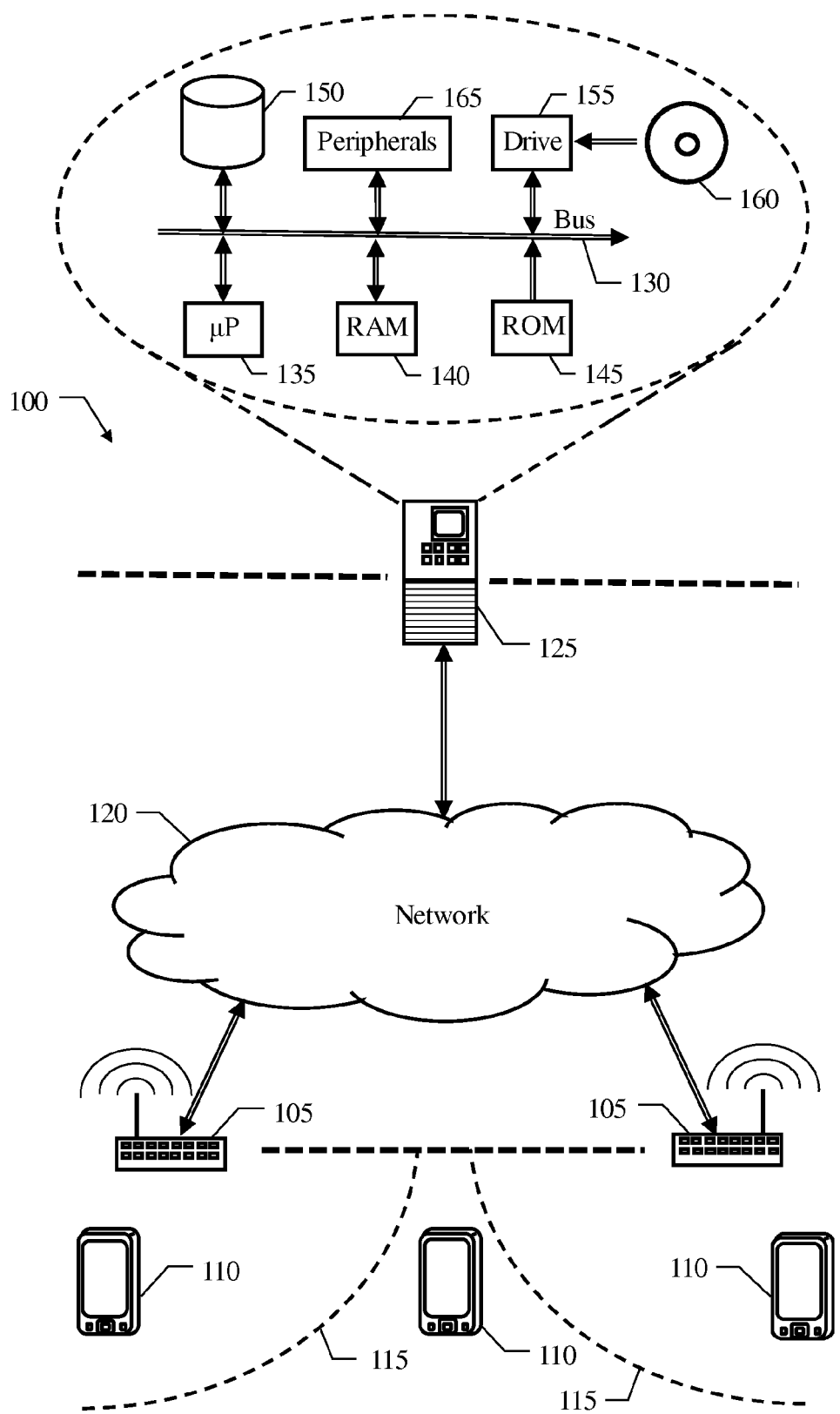
FIG. 1 shows a schematic block-diagram of a computing infrastructure wherein the solution according to an embodiment of the present disclosure may be applied.

With reference to FIG. 1, a schematic block-diagram is shown of a computing infrastructure 100 wherein the solution according to an embodiment of the present disclosure may be applied.

The computing infrastructure 100 comprises several (wireless network) access points 105, for example, of the Wireless Fidelity (Wi-Fi) type. The access points 105 are used to connect different mobile (computing) devices 110 that are within their transmission range 115 into corresponding Wireless Local Area Networks (WLANs).

Each mobile device 110 (for example, a smart-phone or a tablet) is designed to be transported by a user thereof during its normal operation; therefore, the mobile device 110 is generally supplied by battery, it is quite small and light, and it supports wireless connectivity (to the access points 105 in the example at issue). Each mobile device 110 has different apps (i.e., mobile software applications) installed thereon, which may be used to perform corresponding functions by its user.

In turn, the access points 105 are connected to the Internet (for example, through a fixed-line telephone network). The Internet is formed by millions of server computing machines (or simply servers), which are interconnected through a global communication network 120. As far as relevant to the present disclosure, the Internet comprises an app control server 125 (or more); as described in the following, the app control server 125 is used to control the usage of the apps on the mobile devices 110.

The app control server 125 comprises several units that are connected in parallel to a bus structure 130. In detail, one or more microprocessors (μP) 135 control operation of the app control server 125; a RAM 140 is directly used as a working memory by the microprocessors 135, and a ROM 145 stores basic code for a bootstrap of the app control server 125. The app control server 125 also has a mass-memory comprising one or more hard disks 150 and drives 155 for reading/writing removable storage units 160 (for example, optical disks). Moreover, the app control server 125 comprises one or more peripheral units 165, such as a keyboard, a mouse, a monitor and a network adapter (for example, for plugging the app control server 125 in a data center and then allowing it to communicate with the network 120 through a router/switch sub-system thereof). For example, the hard disks 150 may be provided by storage units of the data center, and the drives 155 and the peripheral units 165 may be provided by a console of the data center. Each mobile device 110 has a similar structure, suitably scaled; for example, in this case the mass memory may comprise a flash memory card and the peripheral units may comprise a wireless network adapter of the Wi-Fi type (for communicating with the access points 105), a mobile telephone transceiver for communicating with a mobile telephone infrastructure (not shown in the figure) and a GPS receiver (for tracking a position of the mobile device 110).

With reference now to FIG. 2A-FIG. 2G, an exemplary application is shown of the solution according to an embodiment of the present disclosure.

Figure 2A:
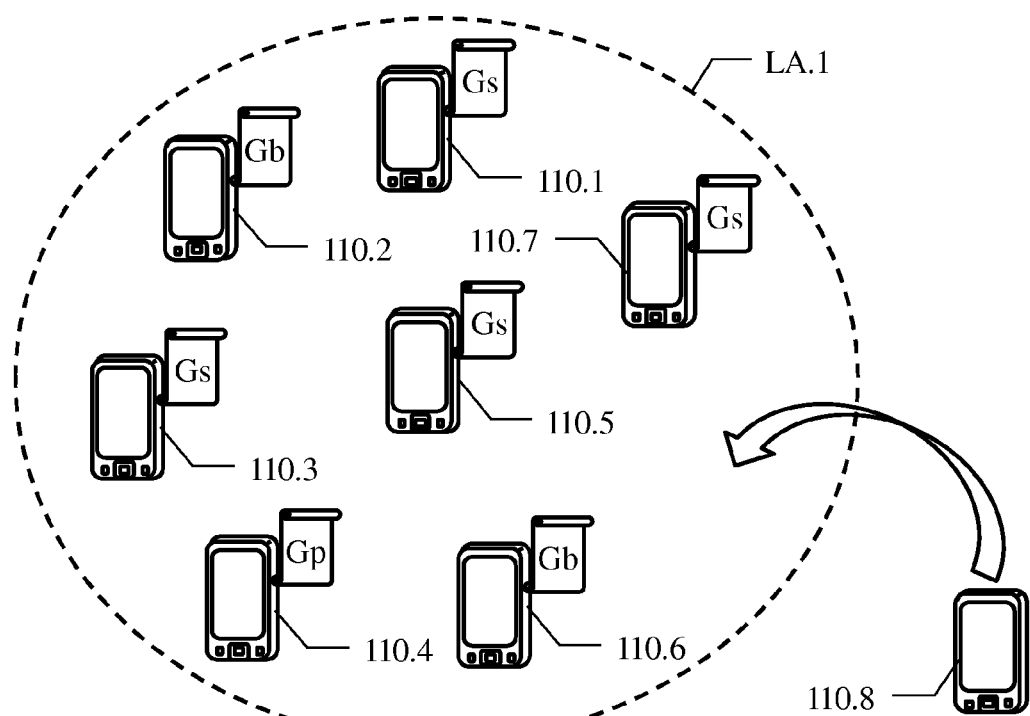
FIG. 2A-FIG. 2G show an exemplary application of the solution according to an embodiment of the present disclosure.

Starting from FIG. 2A, the mobile devices may move across a plurality of locations areas (for example, each one defined by the connection to one or more corresponding access points). A position of the mobile devices (indicated by the access points to which they are connected in the example at issue) is monitored to determine their location areas. For example, in a very simplified scenario as illustrated in the figure, seven mobile devices (differentiated with the references 110.1, 110.2, 110.3, 110.4, 110.5, 110.6 and 110.7) are in a location area LA.1 (for example, a premise of a company).

A plurality of usage groups are defined for each (app) type of the apps that may be used on the mobile devices 110.1-110.7 when they are in the location area LA.1. Each usage group of the app type provides one or more usage characteristics for its apps, i.e., instances thereof (for example, different functionalities/performance); in the example at issue, three usage groups may be defined for an app type implementing an information retrieval service, which app type may be used in a basic mode wherein only limited features are enabled (group Gb), in a standard mode wherein all the features are enabled (group Gs) and in a premium mode wherein all the features are enabled and a minimum bandwidth is guaranteed (group Gp). Each usage group of the app type is also associated with one or more usage weights (for example, license costs); in the example at issue, the usage groups Gb (for the basic mode), Gs (for the standard mode) and Gp (for the premium mode) have increasing usage weights.

Each app running on the mobile devices 110.1-110.7 is associated with one or more usage requirements (for example, functionalities and/or performance that are required by the corresponding users); therefore, in the example at issue the usage requirements may be defined by the features and possibly the bandwidth that are required by the apps of the above-mentioned app type running on the mobile devices 110.1-110.7.

Each app is assigned to one of the usage groups of its app type for the location area of its mobile device. For each location area, the apps of each app type are assigned to the usage groups (of the app type for this location area) whose usage characteristics fulfill the usage requirements of the apps; this operation is performed according to one or more optimization criteria, which depend on the usage weights of the corresponding usage groups (for example, by minimizing a cost function equal to the sum of the usage weights of each usage group multiplied by the number of the apps assigned thereto). Therefore, in the example at issue the above-mentioned apps running on the mobile devices 110.1-110.7 are assigned to the usage groups that provide the required functionalities with the lowest usage weights; as shown in the figure, the apps on the mobile devices 110.2, 110.6 only need to use the limited features so that they are assigned to the usage group Gb, the apps on the mobile devices 110.1, 110.3, 110.5, 110.7 need to use other features (in addition to the limited features) but without any bandwidth requirement so that they are assigned to the usage group Gs, and the app on the mobile device 110.4 needs to use other features (in addition to the limited features) and it requires a bandwidth higher than the (guaranteed) minimum bandwidth so that it is assigned to the usage group Gp. The usage of the apps on the mobile devices 110.1-110.7 is then enabled according to the usage characteristics of the corresponding usage groups (to which they have been assigned); in this way, the apps on the mobile devices 110.2, 110.6 (group Gb) only have the limited features enabled, the apps on the mobile devices 110.1, 110.3, 110.5, 110.7 (group Gs) have all the features enabled and the app on the mobile device 110.4 (group Gp) has all the features enabled with the minimum bandwidth that is guaranteed.

Figure 2B:
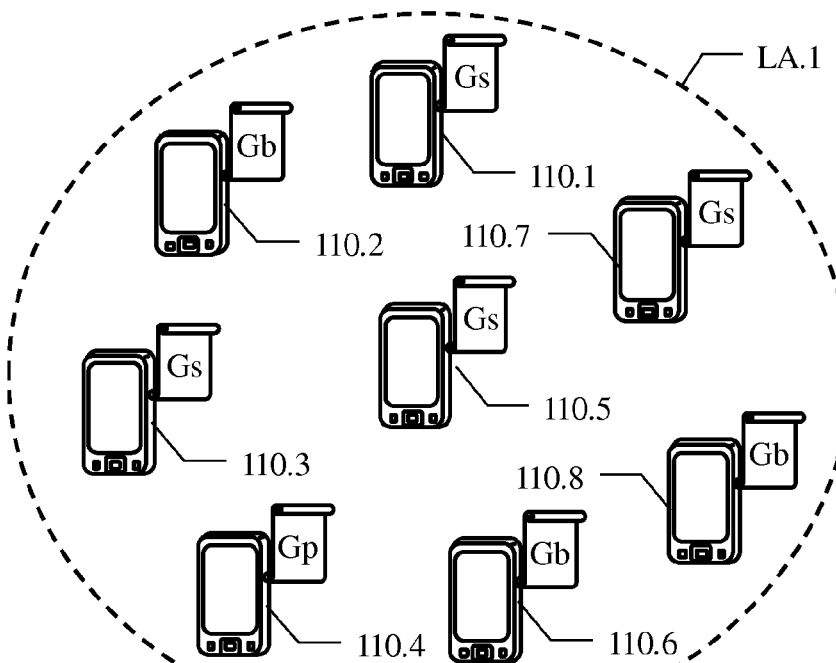

Later on, a further mobile device 110.8 enters the location area LA.1; the mobile device 110.8 runs the same app of the above-mentioned app type; the app on the mobile device 110.8 needs to use the limited features only. Therefore, as shown in FIG. 2B, the app on the mobile device 110.8 is assigned to the usage group Gb (so as to have the limited features only that are enabled).

Figure 2C:
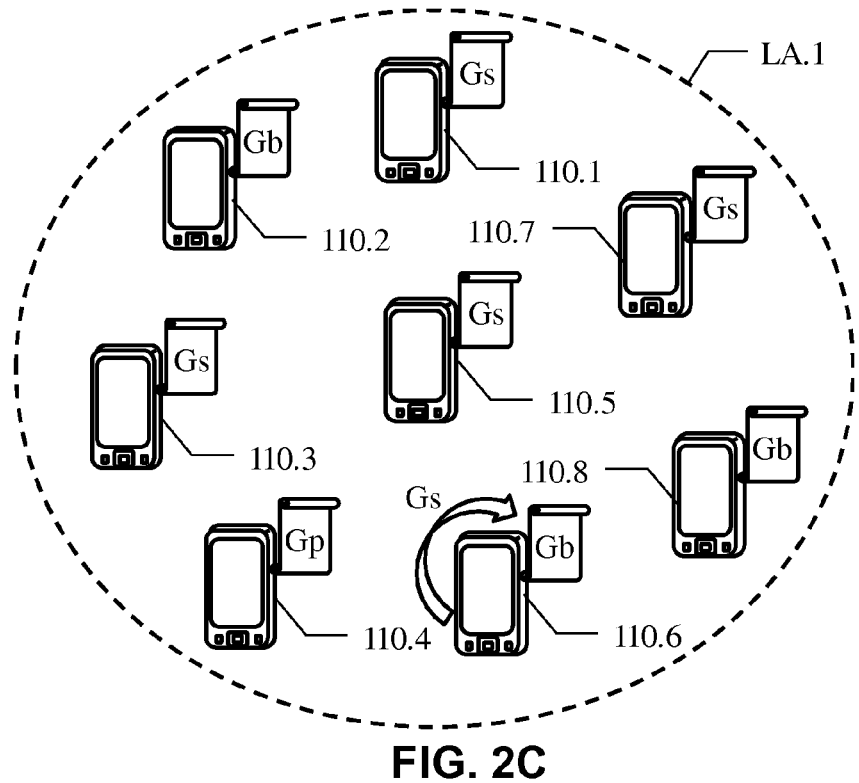

Moving to FIG. 2C, the app on the mobile device 110.6 now needs to use one or more other features of the same app in addition to its limited features (but without any bandwidth requirement). Therefore, the app on the mobile device 110.8 is moved from the usage group Gb to the usage group Gs (so as to have all the features that are enabled).

In this way, the typical nomadic behavior of the mobile devices may be exploited for optimizing the usage of their apps. As a result, the management of corresponding limitations (for example, available license entitlements, allowed resource consumptions) is significantly improved. Moreover, the assignment of the apps to their usage groups is dynamic; for example, this assignment changes automatically over time according to the positions of the mobile devices and/or to their usage requirements.

In an embodiment, each usage group is also associated with one or more usage constraints (for example, a maximum number of apps that may be assigned at the same time to the usage group); in the example at issue, the usage group Gb may have at most 10 apps, the usage group Gs may have at most 5 apps and the usage group Gp may have at most 2 apps.

Figure 2D:
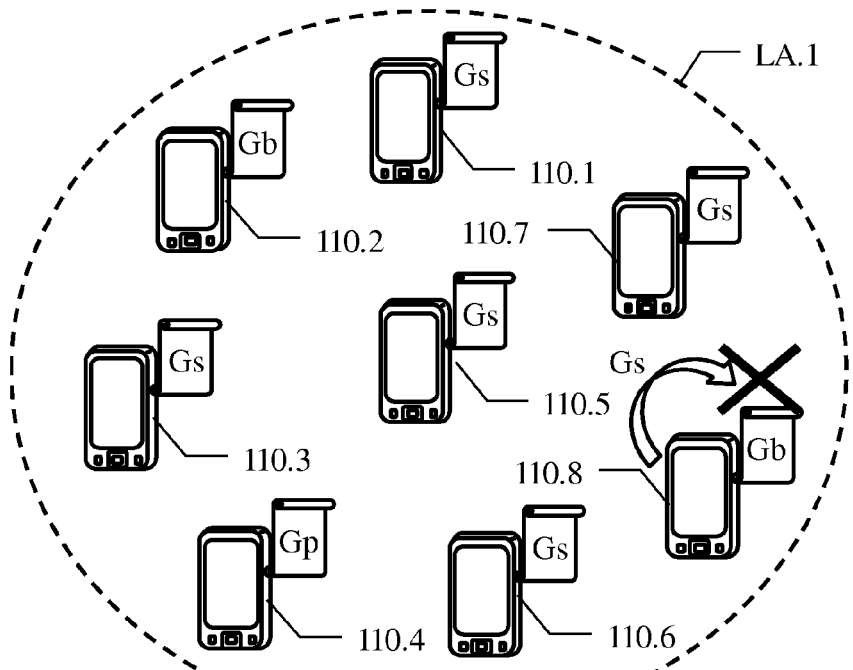

In this situation, it may happen that one or more (non-assignable) apps may not be assigned to any usage group fulfilling their usage requirements. For example, as shown in FIG. 2D, should the app on the mobile device 110.8 need to use one or more other features of the same app in addition to the limited features, it may not be moved from the usage group Gb to the usage group Gs; indeed, in this case the usage constraints of the usage group Gs might not be satisfied since it has already reached its maximum number of apps (5).

Figure 2E:
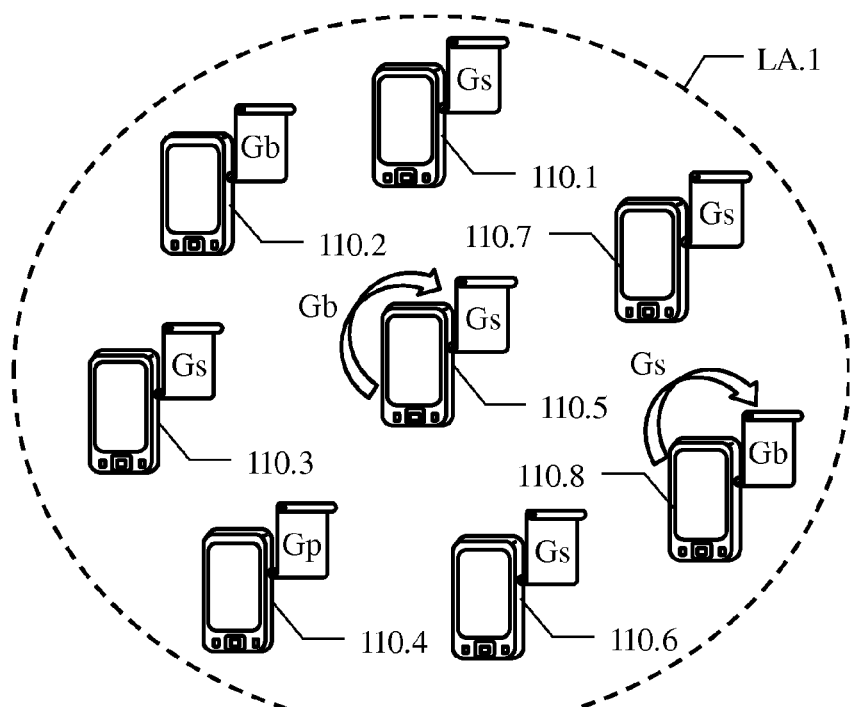

In an embodiment, in response thereto at least one of the apps on the mobile devices 110.1-110.8 is moved from its (current) usage group to a different (new) usage group of the corresponding app type for the location area LA.1. This operation may be based on a usage priority of each app (for example, low for apps running on mobile devices of normal users and high for apps running on mobile devices of privileged users). In the example at issue, as shown in FIG. 2E, the app (assigned to the usage group Gs) running on the mobile device 110.5 has a low priority; therefore, this app may be moved down (i.e., demoted) from the usage group Gs to the usage group Gb, so that the features different from the limited features are not enabled, and then may not be used, any longer. In this way, the apps of the usage group Gs become lower than its maximum number of apps (i.e., 4<5). Therefore, the app on the mobile device 110.8 may now be moved from the usage group Gb to the usage group Gs.

Figure 2F:
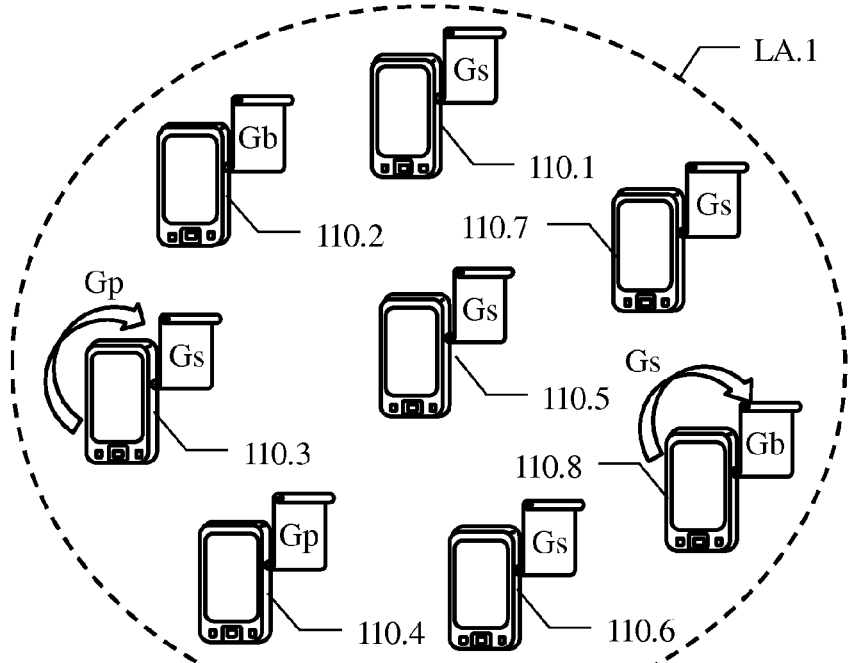

Conversely, as shown in FIG. 2F, the app (assigned to the usage group Gs) running on the mobile device 110.3 has a high priority; therefore, this app may be moved up (i.e., promoted) from the usage group Gs to the usage group Gp, so that all the features remain enabled but now with the minimum bandwidth that is guaranteed. In this case as well, the apps of the usage group Gs become lower than its maximum number of apps (i.e., 4<5). Therefore, the app on the mobile device 110.8 may now be moved as above from the usage group Gb to the usage group Gs.

In this way, all the apps may be assigned to one of the corresponding usage groups (even when their usage constraints would not be satisfied); particularly, when one or more (lower priority) apps are demoted this result is achieved to the detriment of the usage requirements, whereas when one or more (higher priority) apps are promoted the same result is achieved to the detriment of the usage weights.

Figure 2G:
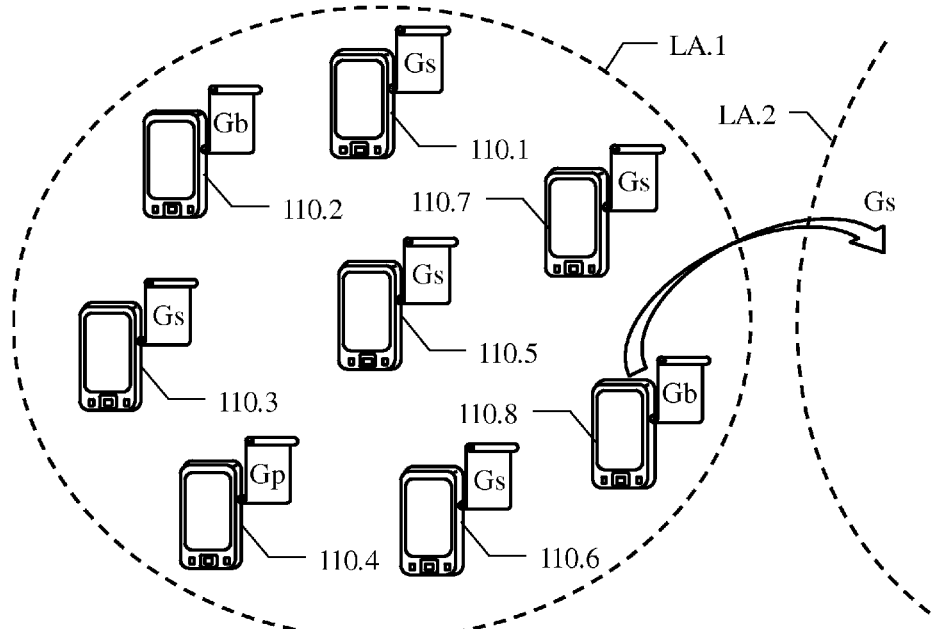

In an embodiment, in addition or in alternative to the above-mentioned movement of the apps among the usage groups, in the same situation an indication of a recovery action may be provided (for example, in a message to the mobile device of each app that may not be assigned); the recovery action indicates an operation that should allow the assignment of this app to a usage group fulfilling its usage requirements. For example, the recovery action may suggest the movement of the mobile device from its (current) location area to a different (new) location area (such as in another premise of the same company). In the example at issue, as shown in FIG. 2G, the mobile device 110.8 might move to a location area LA.2 wherein the apps of the usage group Gs are lower than its maximum number of apps. Therefore, in the location area LA.2 the app on the mobile device 110.8 may now be assigned to the usage group Gs.

In this way, it is possible to satisfy the usage constraints without adversely affecting the usage requirements nor the usage weights (at the cost of some burdens to the users of the mobile devices, such as their movement to a different location area).

Figure 3:
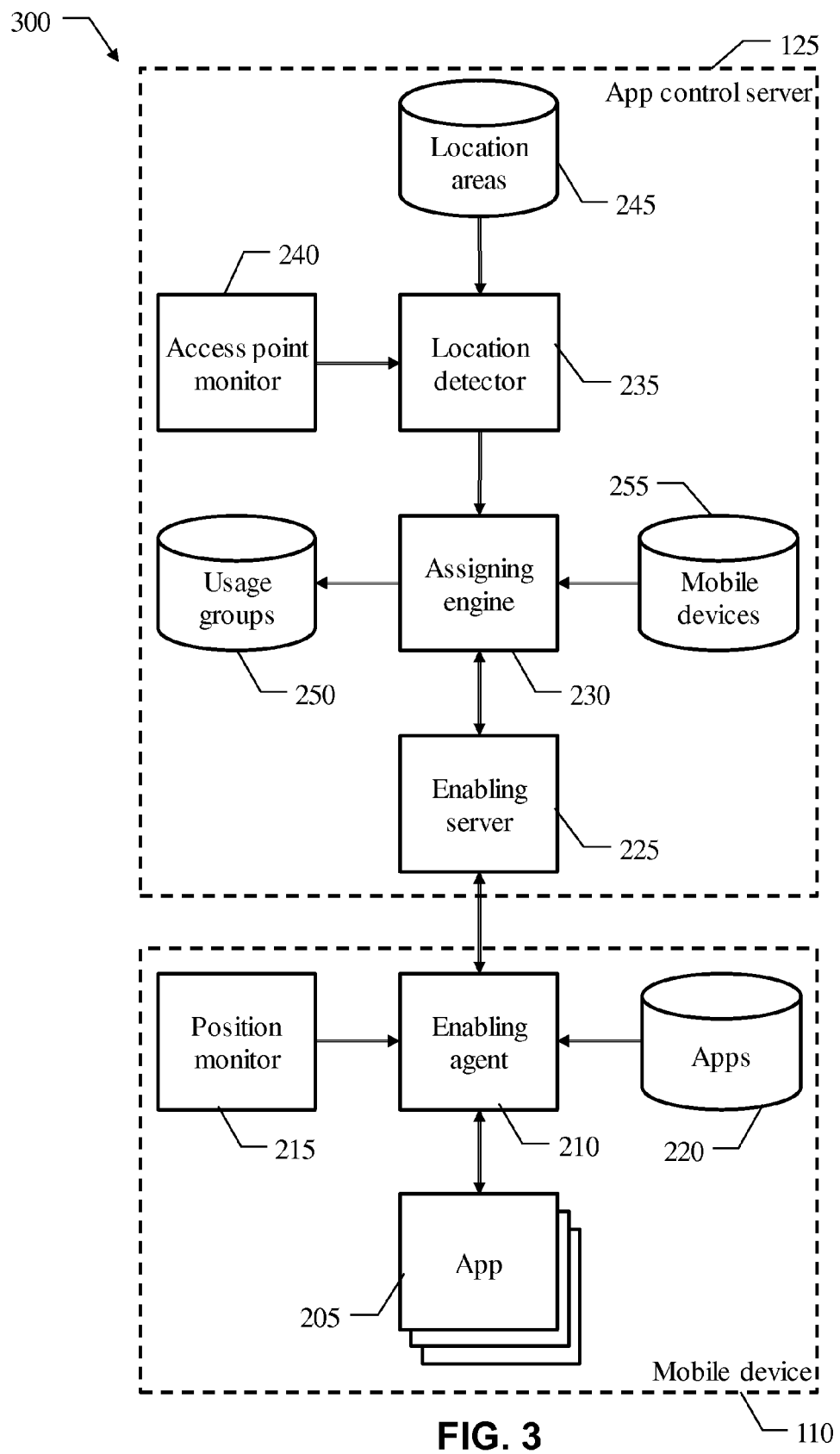
FIG. 3 shows the main software components that may be used to implement the solution according to an embodiment of the present disclosure.

With reference now to FIG. 3, the main software components 300 are shown that may be used to implement the solution according to an embodiment of the present disclosure. The software components 300 are typically stored in the mass memory and loaded (at least partially) into the working memory of the corresponding computing machines when the programs are running. The programs are initially installed into the mass memory, for example, from removable storage units or from the network. In this respect, each software component may represent a module, segment or portion of code, which comprises one or more executable instructions for implementing the specified logical function.

Particularly, each mobile device 110 (only one shown in the figure) runs one or more apps 205. The mobile device 110 also runs an enabling agent 210 (for example, implemented by a specific app as well), which enables the usage of the (other) apps 205 on the mobile device 110. For this purpose, the enabling agent 210 may exploit a position monitor 215, which monitors the position of the mobile device 110 over time (for example, by its GPS receiver). Moreover, the enabling agent 210 accesses an app repository 220, which stores information about all the apps 205 that are installed on the mobile device. For example, the app repository 220 may comprise an entry for each app; the entry indicates the current usage requirements of the app and its functionalities that may involve a change of the usage requirements of the app (such as the features the cause the passage from the basic mode to the standard mode and vice-versa in the above-mentioned example).

Moving to the app control server 125, it runs an enabling server 225, which controls the enablement of the usage of the apps 205 running on selected mobile devices 110 (for example, all the mobile devices of the employees of a corresponding company). For this purpose, the enabling server 225 interacts with the enabling agent 210 of each (selected) mobile device 110. Moreover, the enabling server 225 cooperates with an assigning engine 230, which controls the assignment of the apps to the corresponding usage groups. The assigning engine 230 exploits a location detector 235, which determines the location area of each mobile device according to its position. For this purpose, the location detector 235 may exploit an access point monitor 240, which monitors the mobile devices that are connected to selected access points (for example, in all the premises of the company). The location detector 235 further accesses a location area repository 245, which stores a definition of a plurality of pre-defined location areas; for example, a location area is defined for each premise of the company (as identified by one or more access points thereof), and a further location area is defined outside all the premises of the company.

Moreover, the assigning engine 230 accesses a usage group repository 250, which stores information about all the usage groups that are available. For example, the usage group repository 250 comprises an entry for each location area, which comprises an entry for each app type that may be used in the location area, which in turn comprises an entry for each usage group to which its apps may be assigned when they are running in the location area; the entry indicates the usage characteristics, the usage weights and the usage constraints for the app type in the location area, and information about the corresponding apps that are assigned to the usage group at the moment (such as their app number). The usage characteristics specify how the corresponding apps may be used on the mobile devices. For example, the usage characteristics may be defined in terms of either functionalities or performance; examples of these usage characteristics are enabled features, accessible contents, guaranteed performance. The usage weights define how the usage groups contribute to an optimization of the assignment of the corresponding apps. For example, the usage weights may be defined according to costs incurred by the usage of the corresponding apps in terms of either economic expenses or resource consumptions; examples of these usage weights are an amount of money to be paid, an estimated bandwidth or processing power consumption. The usage constraints define conditions that should be satisfied for the assignment of the corresponding apps to the usage group. For example, the usage constraints may be defined according to either commercial or technical considerations; example of these usage constraints are the maximum number of apps that may run, the maximum amount of resources that may be used (according to corresponding license conditions or resource availabilities).

The assigning engine 230 further accesses a mobile device repository 255, which stores information about all the mobile devices. For example, the mobile device repository 255 comprises an entry for each mobile device; the entry for the mobile device indicates its location area at the moment. In turn, the entry for the mobile device comprises an entry for each app installed thereon; the entry for the app indicates its app type, usage requirements, usage priority and possible usage group to which it is assigned at the moment. The usage requirements define how the app should be used on the mobile device. For example, the usage requirements may be defined individually for each app or globally for each mobile device (or user), either in static terms or in dynamic terms; examples of these usage requirements are required functionalities like features, contents, performance (e.g., a minimum value of a quality of service, or QoS, indicator measuring it, such as bandwidth, response time). The usage priorities define an order of preference for the assignment of the apps to the corresponding usage groups. For example, the usage priorities as well may be defined individually for each app or globally for each mobile device (or user), either in static terms or in dynamic terms; examples of these usage priorities are values depending on a role of the user of the mobile device, on the amount paid for the license of the app, on the waiting time of the app for its use.

Figure 4:
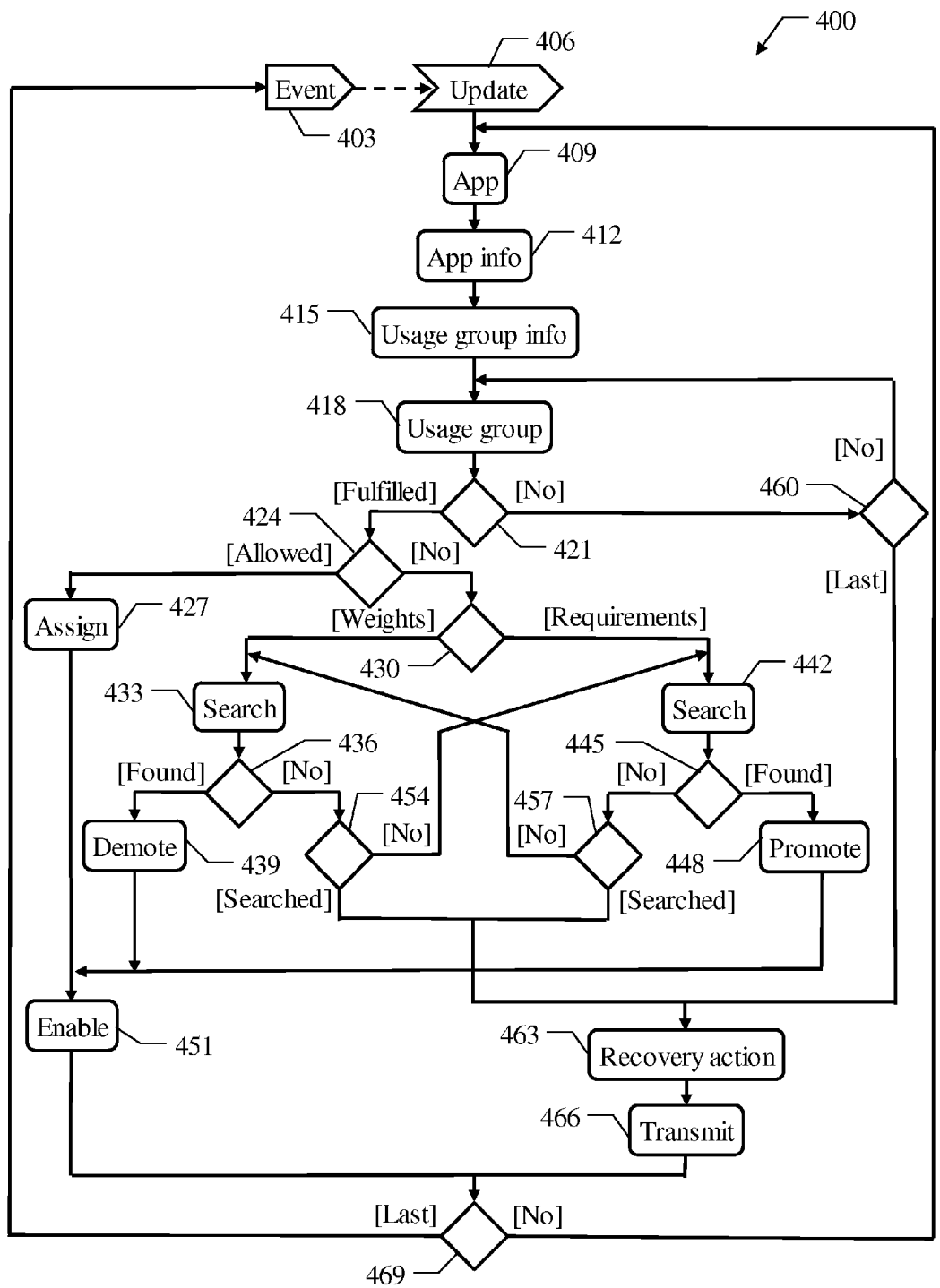
FIG. 4 shows an activity diagram describing the flow of activities relating to an implementation of the solution according to an embodiment of the present disclosure.

With reference now to FIG. 4, an activity diagram is shown describing the flow of activities relating to an implementation of the solution according to an embodiment of the present disclosure.

Particularly, the diagram represents an exemplary process for controlling the usage of the apps on the corresponding mobile devices by the app control server with a method 400. In this respect, each block may represent one or more executable instructions for implementing the specified logical function on the app control server.

The process passes from block 403 to block 406 as soon as a changing event that may cause a change of the usage of the apps occurs. This may happen when a mobile device changes its location area, when an app changes its usage requirements (comprising its starting) or when an app is stopped. For example, the location detector monitors the position of each mobile device (as provided by the access point monitor); the location detector detects any change of location area of a mobile device when it moves from a location area to another location area (as defined in the location area repository) and notifies it to the assigning engine. Moreover, the enabling agent on each mobile device monitors the apps running thereon; the enabling agent detects any change of usage requirements of an app (by comparing any required change of functionalities against the app repository) or its stop. In response thereto, the enabling agent notifies this change to the enabling server, which forwards it to the assigning engine.

In response to any changing event, the enabling agent at first updates the information relating to the previous situation. Particularly, for each app whose mobile device has left an (old) location area or it has been stopped, the assigning engine updates the corresponding entry in the mobile device repository accordingly (decrementing the app number of its usage group). Moreover, the assigning engine verifies whether one or more apps have been demoted/promoted from this (original) usage group to another (current) usage group (as described in the following). If so, the assigning engine selects one of these demoted/promoted app to be restored to its original usage group; for example, the assigning engine privileges the promoted apps or the demoted apps according to a configuration thereof; the promoted apps are selected in increasing order of usage priority and then in decreasing order of time of assignment to the current usage group for the same usage priority or the demoted apps are selected in decreasing order of usage priority and then in increasing order of time of assignment to the current usage group for the same usage priority. The assigning engine moves the selected (demoted/promoted) app back from the current usage group to the original usage group; accordingly, the assigning engine updates the mobile device repository (indicating that the selected app is now assigned to the original usage group) and the usage group repository (decrementing the app number of the current usage group and incrementing the app number of the original usage group). The enabling agent then updates the information relating to the new situation. Particularly, the enabling agent updates the entry in the mobile device repository for the mobile device changing location area or for the app changing usage requirements.

A loop is then performed for processing the impacted apps (i.e., all the apps running on the mobile device changing location area or the specific app changing usage requirements). The loop begins at block 409 wherein the assigning engine takes into account a current one of the impacted apps (starting from a first one in any arbitrary order). The assigning engine at block 412 retrieves information about the current app from the mobile device repository (i.e., its app type, usage requirements and current location area of the corresponding mobile device). Continuing to block 415, the assigning engine retrieves information about all the usage groups of this app type for the current location area from the usage group repository (i.e., usage characteristics, usage weights, usage constraints, assigned apps); these usage groups (being candidate for the assignment of the current app) are arranged in increasing order of usage weights.

A further loop is performed for processing the candidate usage groups. The loop begins at block 418 wherein the assigning engine takes into account a current one of the candidate usage groups (starting from a first one in increasing order of usage weights). The assigning engine at block 421 verifies the usage characteristics of the current usage group against the usage characteristics of the current app;

the flow of activity then branches according to the result of this verification. If the usage characteristics of the current usage groups fulfill the usage characteristics of the current app (meaning that it is appropriate for the assignment of the current app with the lowest usage weights), the assigning engine at block 424 further verifies the assigned apps of the current usage group against its usage constraints. If the assigned apps of the current usage group allow the addition of the current app thereto (for example, when the app number is lower than the maximum number), the flow of activity descends into block 427. In this phase, the assigning engine assigns the current app to the current usage group; accordingly, the assigning engine updates the mobile device repository (indicating that the current app is assigned to the current usage group) and the usage group repository (incrementing the app number of the current usage group and possibly decrementing the app number of its previous usage group).

Conversely, if the assigning engine at the block 424 determines that the assigned apps of the current usage group do not allow the addition of the current app thereto (i.e., when the app number has already reached the maximum number in the example at issue), the flow of activity descends into block 430. In this case, the current app may not be assigned to the current usage group, i.e., the usage group that is appropriate to fulfill the usage requirements of the current app with the lowest usage weights; therefore, the flow of activity branches according to a configuration of the assigning engine.

Particularly, if the assigning engine is configured to privilege the usage weights (to the detriment of the usage requirements), the assigning engine at block 433 searches for any other (new) usage group, of the same app type of the current app, with lower usage weights (in decreasing order thereof) that is suitable to receive the addition of a further app (i.e., with the app number lower than the maximum number in the example at issue). The flow of activity further branches at block 436 according to the result of this search. If the new usage group has been found, the assigning engine at block 439 selects an app, among the current app and the apps of the same app type thereof assigned to the current usage group, for its demotion to the new usage group (for example, in increasing order of usage priority and then in decreasing order of time of assignment to the current usage group for the same usage priority); at this point, the assigning engine assigns the current app to the current usage group if necessary (updating the corresponding information as above), and then it moves the selected app from the current usage group to the new usage group by accordingly updating the mobile device repository (indicating that the selected app is now assigned to the new usage group) and the usage group repository (decrementing the app number of the current usage group if necessary and incrementing the app number of the new usage group).

Referring back to the block 430, if the assigning engine is configured to privilege the usage requirements (to the detriment of the usage weights), the assigning engine at block 442 searches for any other (new) usage group, of the same app type of the current app, with higher usage weights (in increasing order thereof) that is suitable to receive the addition of a further app as above. The flow of activity further branches at block 445 according to the result of this search. If the new usage group has been found, the assigning engine at block 448 selected an app, among the current app and the apps of the same app type thereof assigned to the current usage group, for its promotion to the new usage group (for example, in decreasing order of usage priority and then in increasing order of time of assignment to the current usage group for the same usage priority); at this point, the assigning engine assigns the current app to the current usage group and then it moves the selected app from the current usage group to the new usage group as above.

The flow of activity passes to block 451 from the block 427, from the block 439 or from the block 448. At this point, the assigning engine notifies the enabling server of the changes that have occurred (i.e., the assignment of the current app with the possible demotion/promotion of the selected app); the enabling server in turn enables the usage of these apps accordingly (enabling/disabling corresponding functionalities) by sending corresponding messages to the enabling agents of their mobile devices.

Returning to the block 436, if no app may be demoted, the assigning engine at block 454 verifies whether the usage groups for the promotion of the apps have already been searched. If not, the flow of activity returns to the block 442 in order to attempt promoting an app as above. Likewise, returning to the block 445, if no app may be promoted, the assigning engine at block 457 verifies whether the usage groups for the demotion of the apps have already been searched. If not, the flow of activity returns to the block 433 in order to attempt demoting an app as above.

Referring back to the block 421, if the usage characteristics of the current usage group do not fulfill the usage characteristics of the current app, the assigning engine at block 460 verifies whether a last one of the candidate usage groups has been taken into account. If not, the process returns to the block 418 to repeat the same operations on a next one of the candidate usage groups (with higher usage weights). Conversely (i.e., when no usage group whose usage characteristics may fulfill the usage requirements of the current app is available in the current location area), the flow of activity descends into block 463; the same point is also reached from the block 454 or from the block 457 when no app may be demoted nor promoted to allow assigning the current app to the current usage group. At this point, the assigning engine determines any actions that may be performed in an attempt to allow the assignment of the current app; for example, the assigning engine may search for a different (new) location area, in decreasing order of distance from the current location area, wherein all the apps running on the same mobile device of the current app may be assigned to a usage group (by repeating the same operations described above). Continuing to block 466, the assigning engine notifies these recovery actions (for example, suggesting the movement to the new location area when it is found or indicating the impossibility of using the current app at the moment otherwise) to the enabling server, which in turn forwards them to the enabling agent of the mobile device of the current app for their display thereon.

The flow of activity then passes to block 469 from the block 451 or from the block 466. At this point, the assigning engine verifies whether a last one of the impacted apps has been taken into account. If not, the process returns to the block 409 to repeat the same operations on a next one of the impacted apps. Conversely, the flow of activity returns to the block 403 waiting for a next changing event.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling usage of one or more software programs on one or more mobile computing devices. However, the method may be used to control any usage of the software programs (for example, their running or even simply their downloading, in any organization or in a corresponding online store). The software programs may be in any number and of any type (for example, apps for whatever purpose such as email clients, remote banking services, navigators, or widgets, agents) and they may run on any number and type of mobile computing devices (for example, netbooks).

In an embodiment, the method comprises monitoring an indication of a position of each mobile computing device, in order to determine a location area of the mobile computing device (among a plurality of location areas). However, the position of the mobile device may be indicated in any way (for example, by its GPS coordinates, mobile telephone cell, IP address) and it may be monitored in any way (for example, by the mobile device itself); moreover, the location area of the mobile device may be determined in any way (for example, by comparing its GPS coordinates with predefined ranges, on the mobile device as well), and the location areas may be in any number and of any type (for example, geographical regions such as states or cities, known establishments such as schools, museums, shopping centers, possibly with a default location area for the mobile devices whose position is not known).

In an embodiment, the method comprises assigning each one of the software programs to a usage group (among a plurality of usage groups of a software program type of the software program for the location area of the corresponding mobile computing device). For each location area, the software programs of each software program type are assigned to the corresponding usage groups providing one or more usage characteristics that fulfill one or more usage requirements of each software program; this is performed according to one or more optimization criteria depending on one or more usage weights of each usage group. However, the usage groups may be in any number, each one with any number and type of usage characteristics and usage weights, and each software program may have any number and type of usage requirements (see below). Moreover, the software programs may be assigned to the usage groups according to any number and type of optimization criteria; for example, this operation may be performed analytically by optimizing, i.e., minimizing or maximizing, any target function based on the usage weights (for example, differentiating the contribution of the usage weights according to characteristics of the mobile devices, for example, increasing with a processing power thereof). In any case, this operation may be performed at any time (for example, for all the software programs on the mobile computing devices of each location area periodically, in response to any configuration change or to a corresponding command).

In an embodiment, the method comprises enabling the usage of each software program according to the usage characteristics of the corresponding usage group. However, the usage of the software programs may be enabled in any way, even for a limited period of time only (for example, by downloading corresponding tokens to the mobile devices).

In an embodiment, the usage requirements of at least one of the software programs comprise a required value of one or more performance indicators of the software program. However, the usage requirements (of any number of software programs) may comprise the required value of any number and type of performance indicators (for example, latency, data transfer rate). In an embodiment, the usage characteristics of at least one of the usage groups comprise a minimum value of one or more performance indicators of the corresponding software program type. However, the usage characteristics (of any number of usage groups) may comprise the minimum value of any number and type of performance indicators (see above). In an embodiment, the usage requirements of at least one of the software programs comprise one or more required features of the software program. However, the usage requirements (of any number of software programs) may comprise any number and type of required features (for example, enablement of components, allocation of resources). In an embodiment, the usage characteristics of at least one of the usage groups comprise one or more enabled features of the corresponding software program type. However, the usage characteristics (of any number of usage groups) may comprise any number and type of enabled features (see above). More generally, the usage requirements and the usage characteristics may be defined in different, alternative or additional ways (for example, only by performance indicators, only by features, by any combinations thereof, by Service Level Agreements, or SLAs).

In an embodiment, the usage weights of at least one of the usage groups comprise one or more license cost indicators of the corresponding software program type. However, the usage weights (of any number of usage groups) may comprise any number and type of license cost indicators (for example, a flat amount up to a threshold number of software programs and then a fixed amount for each additional software program, different costs for different types of mobile computing devices). More generally, the usage weights may be defined in different, alternative or additional ways (for example, by resource consumption indicators, by any combinations of license cost indicators and resource consumption indicators).

In an embodiment, said step of assigning each one of the software programs to a usage group comprises, for each location area, assigning the software programs of each software program type to the usage groups of the software program type for the location area further according to one or more usage constraints of the usage groups of the software program type for the location area. However, any number of usage groups (down to none) may comprise any number and type of usage constraints (for example, a maximum total processing power of the mobile computing devices wherein the software programs run, a maximum total bandwidth assigned to the software programs, specific usage policies such as a maximum usage time).

In an embodiment, said step of assigning each one of the software programs to a usage group comprises, for each location area, moving at least one of the software programs from the corresponding usage group to a different one of the usage groups of the corresponding software program type for the location area. However, any number of software programs may be moved to any different usage group (for example, only promoting them, only demoting them, only moving them to a directly adjacent usage group in terms of usage weights); in any case, this feature may also be omitted in a simplified implementation.

In an embodiment, said step of assigning each one of the software programs to a usage group comprises, for each location area, moving at least one of the software programs from the corresponding usage group to a different one of the usage groups of the corresponding software program type for the location area according to a usage priority of each software program of the software program type in the location area. However, the usage priorities may be defined in any way (for example, with a range of values, only low/high, with a default value when it is not specified); moreover, the movement of the software programs to different usage groups may be performed according to the usage priorities in any way (for example, with same values thereof that prevent the demotion and/or the promotion). In any case, this operation may be based on different, alternative or additional criteria, even without the use of any usage priority (for example, according to the past or remaining running time of the software programs).

In an embodiment, the method comprises the following step in response to at least one non-assignable software program of the software programs being not assignable to any usage group; an indication of at least one recovery action, for allowing said assigning each non-assignable software program to a usage group, is provided to the corresponding mobile computing device. However, this operation may be performed in response to different, alternative or additional events (for example, when a cost of the assignment of the apps exceeds a threshold), or it may be omitted at all. Moreover, the recovery actions may be in any number and of any type (see below), and they may be provided to the mobile computing devices in any way (for example, via notifications, SMSs, e-mails).

In an embodiment, said step of providing an indication of at least one recovery action comprises the following operations for each non-assignable software program. At least one new location area of the location areas (different from the location area of the mobile device of the non-assignable software program) is selected wherein said assigning the non-assignable software program to a usage group is possible; an indication of said at least one new location area is provided to the mobile computing device of the non-assignable software program. However, the new location areas may be selected in any number and in any way (for example, only within a predetermined distance) and any indication thereof (for example, corresponding descriptive names) may be provided to the mobile computing devices in any way (see above). More generally, different, alternative or additional recovery actions may be envisaged (for example, suggesting the use of different software programs).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the same method as above when the computer program is executed on the computing system. An embodiment provides a computer program product for controlling usage of one or more software programs on one or more mobile computing devices; the computer program product comprises a computer readable storage medium having program instructions embodied therewith, wherein the program instructions is executable by a computing system to cause the computing system to perform the same method as above. However, the program may be implemented as a stand-alone module, as a plug-in for a pre-existing application (for example, a licensing application), or even directly in the latter; moreover, the program may be implemented on any number and type of servers (for example, as a service) or even in part or entirely on the mobile computing devices.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment provides a system configured for performing the steps of the same method. However, the method may also be carried out on a system based on a different architecture (for example, a local, wide area, global, cellular or satellite network), and exploiting any type of (wired and/or wireless) connections.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A method for controlling usage of one or more software programs on one or more mobile computing devices, the method comprising:
    monitoring an indication of a position of each mobile computing device to determine a location area of the mobile computing device, among a plurality of location areas;
    assigning each one of the software programs to a usage group, among a plurality of usage groups of a software program type of the software program for the location area of the corresponding mobile computing device, wherein for each location area the software programs of each software program type are assigned to the corresponding usage groups providing one or more usage characteristics that fulfill one or more usage requirements of each software program according to one or more optimization criteria depending on one or more usage weights of each usage group; and
    enabling usage of each software program according to the usage characteristics of the corresponding usage group.

2. The method according to claim 1, wherein the usage requirements of at least one of the software programs comprise a required value of one or more performance indicators of the software program, and wherein the usage characteristics of at least one of the usage groups comprise a minimum value of one or more performance indicators of the corresponding software program type.

3. The method according to claim 1, wherein the usage requirements of at least one of the software programs comprise one or more required features of the software program, and wherein the usage characteristics of at least one of the usage groups comprise one or more enabled features of the corresponding software program type.

4. The method according to claim 1, wherein the usage weights of at least one of the usage groups comprise one or more license cost indicators of the corresponding software program type.

5. The method according to claim 1, wherein said assigning each one of the software programs to a usage group comprises, for each location area:
  assigning the software programs of each software program type to the usage groups of the software program type for the location area further according to one or more usage constraints of the usage groups of the software program type for the location area.

6. The method according to claim 5, wherein said assigning each one of the software programs to a usage group comprises, for each location area:
  moving at least one of the software programs from the corresponding usage group to a different one of the usage groups of the corresponding software program type for the location area.

7. The method according to claim 6, wherein said assigning each one of the software programs to a usage group comprises, for each location area:
  moving at least one of the software programs from the corresponding usage group to a different one of the usage groups of the corresponding software program type for the location area according to a usage priority of each software program of the software program type in the location area.

8. The method according to claim 1, wherein in response to at least one non-assignable software program of the software programs being not assignable to any usage group, the method further comprises:
  providing an indication of at least one recovery action, for allowing said assigning each non-assignable software program to a usage group, to the corresponding mobile computing device.

9. The method according to claim 8, wherein said providing an indication of at least one recovery action comprises, for each non-assignable software program:
  selecting at least one new location area of the location areas, different from the location area of the mobile device of the non-assignable software program, wherein said assigning the non-assignable software program to a usage group is possible; and
  providing an indication of said at least one new location area to the mobile computing device of the non-assignable software program.

* * * * *